Figure 1:
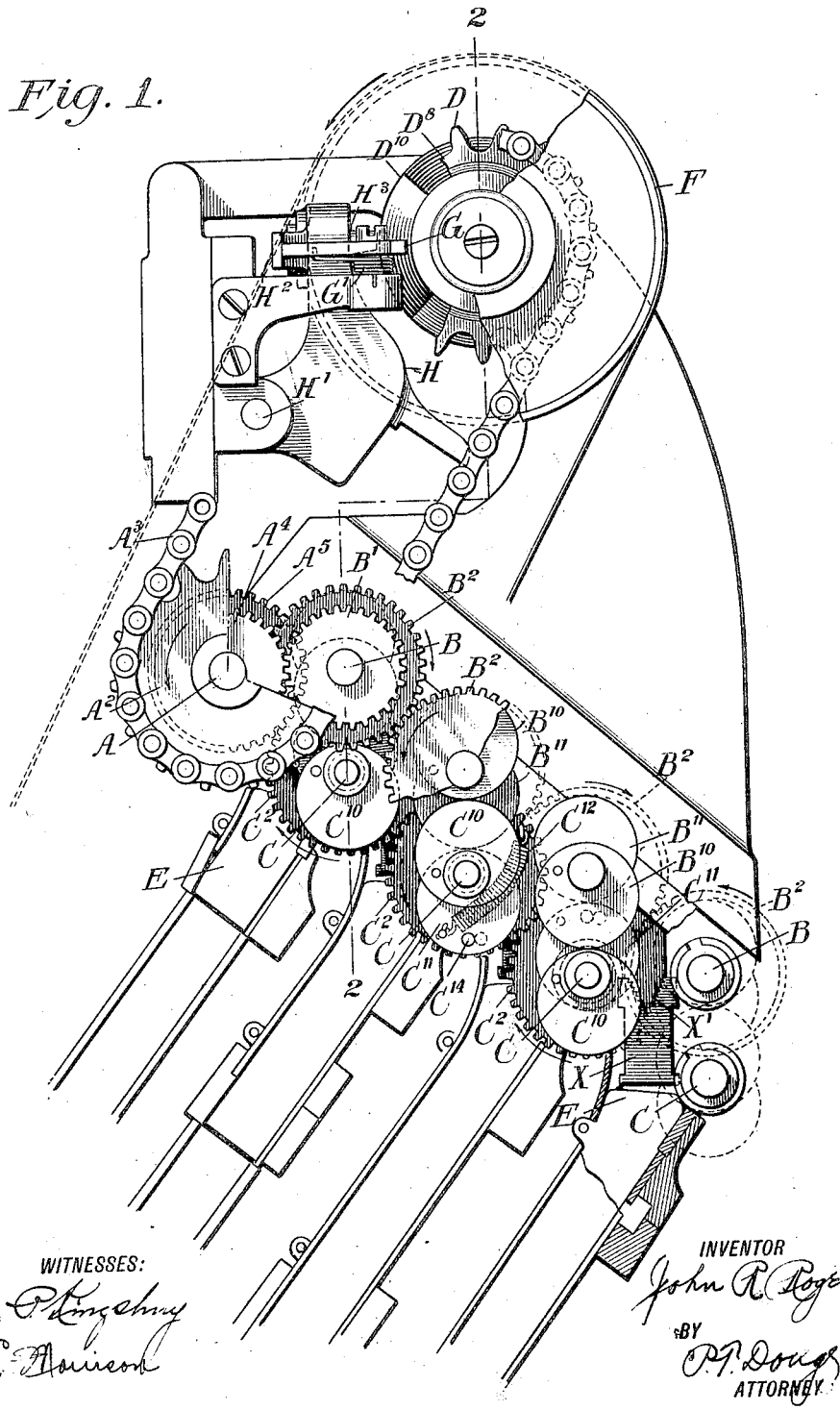

J. R. ROGERS.
TYPOGRAPHICAL COMPOSING MACHINE.
APPLICATION FILED APR. 1, 1912.

1,074,980.

Patented Oct. 7, 1913.

J. R. ROGERS.
TYPOGRAPHICAL COMPOSING MACHINE.
APPLICATION FILED APR. 1, 1912.

1,074,980.

Patented Oct. 7, 1913.
4 SHEETS—SHEET 4.

WITNESSES:
Geo. P. Kingsley
L. E. Morrison

INVENTOR
John R. Rogers
BY
P. T. Dodge
ATTORNEY

UNITED STATES PATENT OFFICE.

JOHN RAPHAEL ROGERS, OF BROOKLYN, NEW YORK, ASSIGNOR TO MERGENTHALER LINOTYPE COMPANY, A CORPORATION OF NEW YORK.

TYPOGRAPHICAL COMPOSING-MACHINE.

1,074,980. Specification of Letters Patent. Patented Oct. 7, 1913.

Application filed April 1, 1912. Serial No. 687,691.

*To all whom it may concern:*

Be it known that I, JOHN RAPHAEL ROGERS, a citizen of the United States, and a resident of Brooklyn, county of Kings, and State of New York, have invented a new and useful Improvement in Typographical Composing-Machines, of which the following is a specification.

My invention relates to typographical composing machines, such as linotype machines of the general organization represented in Letters Patent of the United States, No. 436,532, to O. Mergenthaler, wherein circulating matrices are released from a magazine in the order in which their characters are to appear in print and then assembled in line, the composed line transferred to the face of a mold, the mold filled with molten metal to form a slug or linotype against the matrices which produce the type characters thereon, and the matrices thereafter returned through a distributing mechanism to the magazine from which they started.

More particularly the invention relates to the distributing mechanism, and is shown by way of example and in preferred form in connection with a machine, wherein a plurality of distributers are arranged in associated relation to each other. However, it will be apparent that my improvements may be similarly employed in connection with a single distributer, and that there is no limitation imposed by their present mode of illustration.

In the Mergenthaler patent above mentioned, the distributing devices comprise rotating screws which convey the matrices along a grooved rail or bar, from which they are released at the proper points to return them to the appropriate channels in the magazine, and my invention is herein set forth in connection with that specific mechanism. Obviously, however, the principles thereof are capable of far broader application, and may be adapted to distinctly different styles of distributers, as well as to other forms of typographical machines, such for instance as those which handle type or dies instead of matrices. Generally speaking, I desire it to be understood that I do not limit myself to any specific form or embodiment except in so far as such limitations are specified in the claims.

A principal specific object of the invention is to arrest positively the rotating distributer screws or equivalent devices, in the event that a type or matrix, while in relation thereto, is improperly arrested, as for instance if it becomes lodged in the entrance to a magazine and there resists the normal operation of the screw or similar part. The screws or equivalent members are ordinarily synchronously rotated or operated, and I propose to construct them so that in the event of undue resistance or other similar derangement, this synchronism will be interrupted, thereby calling into action certain connected parts, which ordinarily run freely but which in such circumstances are thrown out of their normal relations, and as a result thereof interfere and contact with each other so as positively to arrest the further operation of the screws or other members. More specifically, I provide means in the form of eccentrics, specially formed gears, or the like, mounted upon the screws in such manner that ordinarily they clear each other, but are thrown into interfering orbits immediately when the synchronism of the rotating screws is disturbed,—the result of this action involving their binding or contact in such manner that the screws are positively arrested and the breakage or bending of the parts or of the type or matrices is therefore avoided.

Another feature of the invention, and one which may be used either in connection with the devices above referred to or absolutely independently thereof if desired, is a special means for disengaging the driving mechanism in the event that the operation of the distributing devices is arrested, whether this happens because of the action of the parts already described, or in some totally different manner. In other words, although this feature may be employed advantageously with the means for positively arresting the screws, it is similarly applicable to any form of distributer, or other mechanism, wherein it may be desired to unclutch or otherwise disengage the driving means in the event of the arrest of the driven parts.

Figure 2:
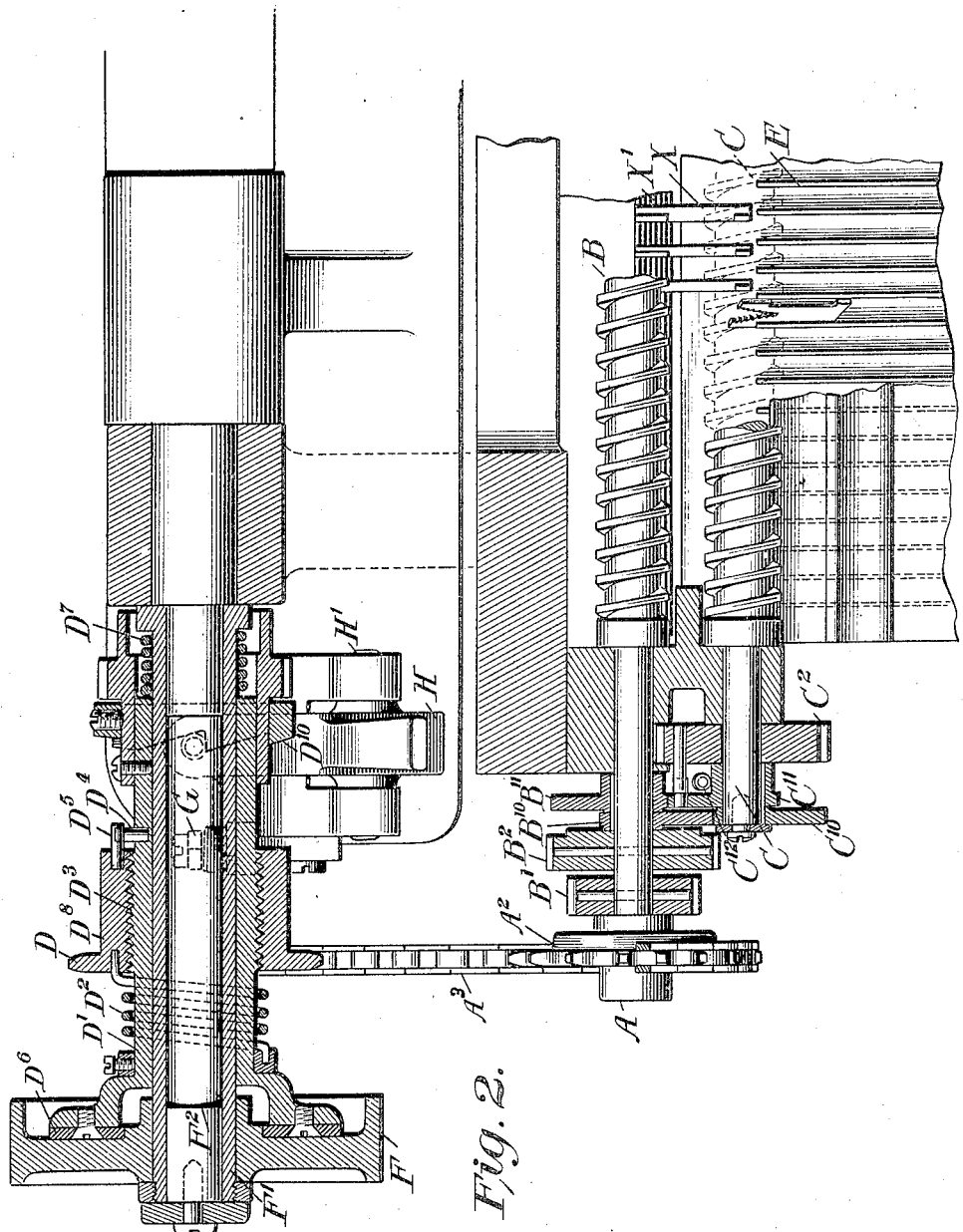
Figure 3:
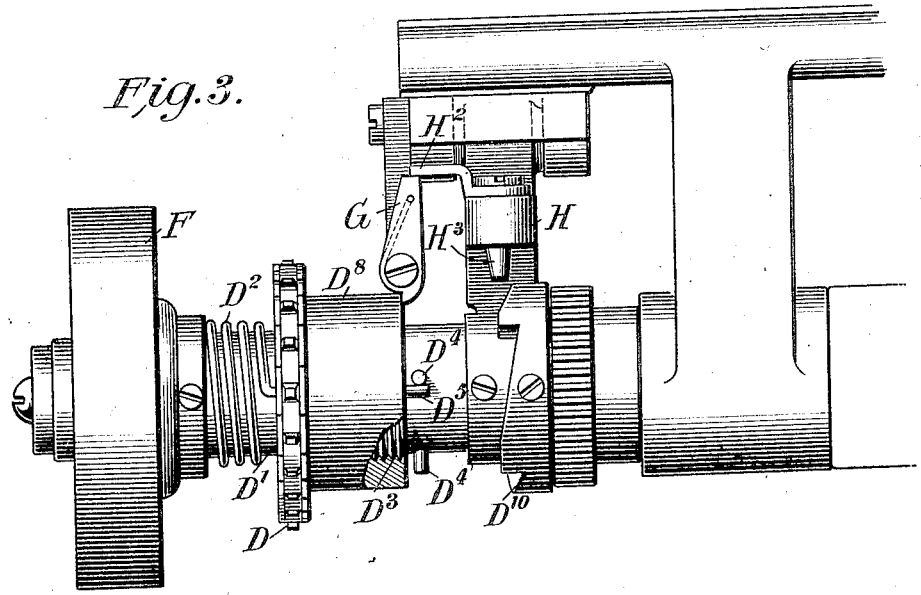
Figure 4:
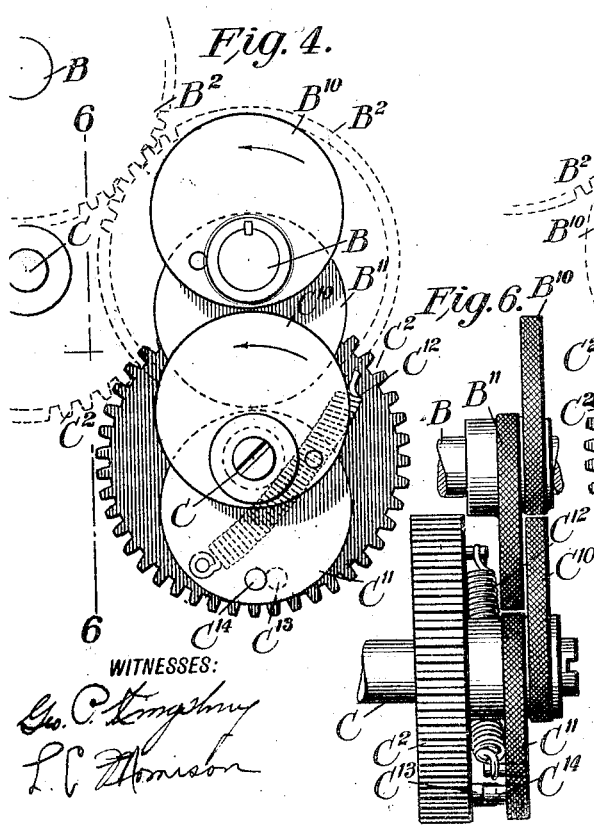
Figure 6:
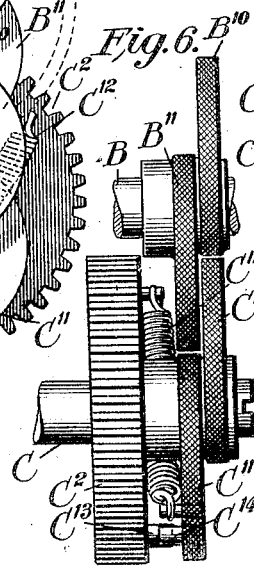
Figure 5:
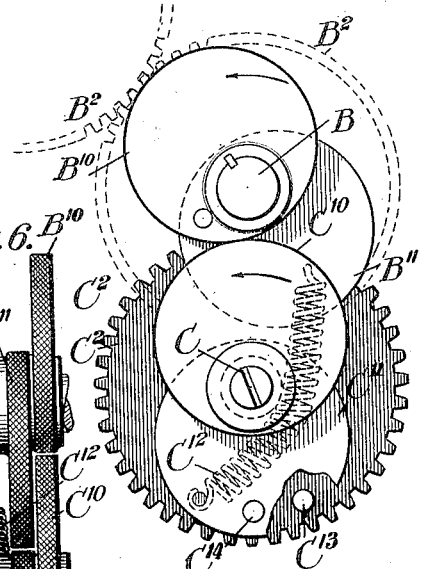
Figure 7:
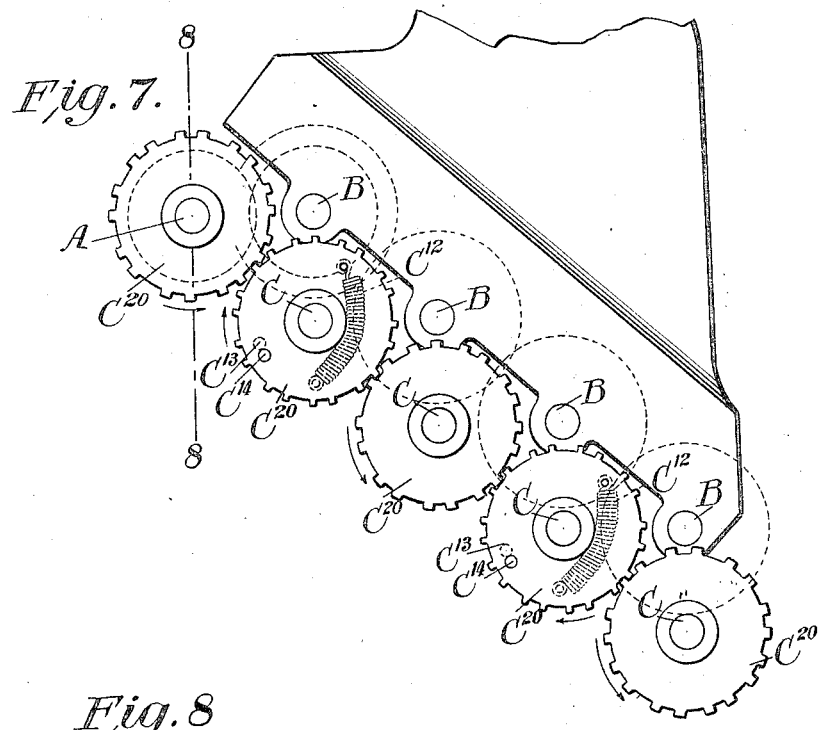
Figure 8:
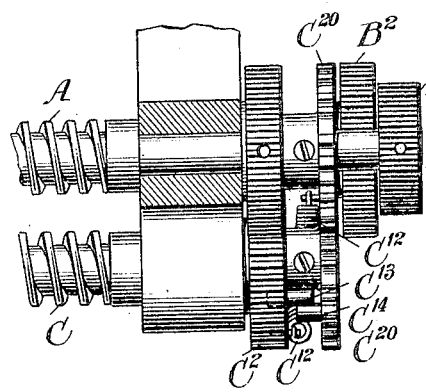
Figure 9:
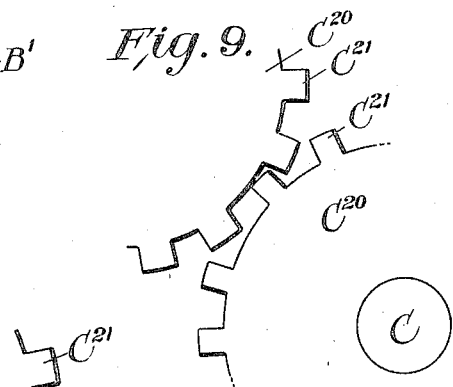
Figure 10:
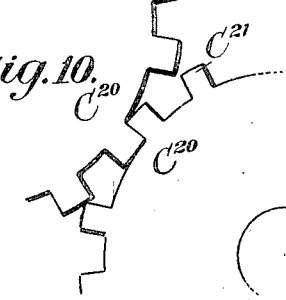

Referring to the drawings: Figure 1 is an end view of the distributing devices, etc., having my invention applied thereto, partly broken away and partly in section; Fig. 2 is a vertical sectional view, taken substantially on the line 2—2 in Fig. 1; Fig. 3 is a top plan view of the driving mechanism and disengaging devices, etc., partly broken away; Fig. 4 is an end view of a pair of screws, the connected eccentrics, etc., illustrating their normal operation when the screws are synchronously operated; Fig. 5 is a similar view, illustrating the locking and arresting action of the eccentrics when the synchronism is interrupted; Fig. 6 is a side view of the parts shown in Fig. 4; Fig. 7 is a view of a modified form, wherein gears are substituted for the eccentrics; Fig. 8 is a sectional view, taken substantially on the line 8—8 in Fig. 7; Fig. 9 is a detail view, illustrating the normal engagement of the gears when the screws are synchronously operated; and Fig. 10 is a similar view, illustrating the interference and locking action of the gears when the synchronism is interrupted.

Referring first to Figs. 1 to 6, the matrices X are released from the distributer rail or bar $X^1$ and pass into the magazine channels E in the usual manner. The matrices are caused to travel along this rail or bar by synchronously rotated screws, also as usual, in the present instance the first screw in the upper series being designated by the reference letter A, the other screws in the upper series by the letter B, and the screws in the lower series by the letter C. The screw A is provided with the sprocket wheel $A^2$ which is actuated by the sprocket chain $A^3$, and from the screw A motion is imparted to the other screws B and C by the gearing now to be described. The screw A has a gear $A^4$ which engages the gear $B^1$ on the first screw B, and each screw B carries a gear $B^2$, which gears $B^2$ mesh into each other and constitute a train of gearing so that all of the screws B are synchronously rotated from the screw A. The screw A also has a gear $A^5$ which engages a gear $C^2$ on the first lower screw C, the other screws C being also each provided with a similar gear $C^2$, and all of the gears $C^2$ meshing into each other and forming a train of gearing, whereby the screws C are actuated from the screw A in synchronism therewith and consequently also in synchronism with the screws B. It will be understood that this particular system of gearing is unessential to the invention and has been described simply by way of example. For present purposes it is necessary merely to consider the relative operation of two synchronously actuated screws, such for instance as the screws B and C of any particular pair, the special means for imparting such synchronous operation thereto being immaterial and dependent upon the particular application of the invention, that is to say, whether in single series, or in a plurality of such series as in the illustrated instance.

Referring now to the first branch of the invention it will be noted that in Figs. 1 to 6, each screw B and C of a single pair is provided with two eccentrics fast thereon, the screw B with the oppositely located eccentrics $B^{10}$ and $B^{11}$, and the screw C with the oppositely located eccentrics $C^{10}$ and $C^{11}$. It will be further noted that these pairs of eccentrics are so arranged that the eccentrics $B^{10}$ and $C^{10}$ are in one and the same plane, and that the eccentrics $B^{11}$ and $C^{11}$ are in another plane. It follows from this arrangement that the eccentrics $B^{10}$ and $C^{10}$, and the eccentrics $B^{11}$ and $C^{11}$ respectively, under normal conditions run closely together at their peripheries throughout their rotation, although not touching or interfering with each other,—by analogy, somewhat in the same manner as a pair of eccentric gears. This desired and normal operation of the parts is the one that results from the synchronous operation of the screws B and C, and is indicated in Fig. 4. To provide for abnormal resistance that may be offered to the rotation of one of the screws, as for instance if a matrix X should become lodged in the mouth of a magazine channel E without being disengaged from the screw C, means are afforded to permit the screw C to be retarded with relation to the screw B, or in other words to interrupt their synchronism. Such yielding means may be of many different forms, but for purposes of illustration I have shown the driving gear $C^2$ as loosely mounted on the screw C, and provided with a spring $C^{12}$ connected to it and to the fixed eccentric $C^{11}$, the spring $C^{12}$ being of sufficient strength to hold the loose gear $C^2$ in proper relation to the screw C in normal operation, and contact pins $C^{13}$ and $C^{14}$ being formed respectively on the gear $C^2$ and eccentric $C^{11}$ to limit the action of the spring and locate the gear in operative position in ordinary circumstances. In the previously mentioned event of undue resistance to the rotation of the screw, caused for instance by the accidental lodgment of a matrix in a channel mouth, the spring $C^{12}$ yields and permits the movement of the gear $C^2$ with relation to the screw C; and the synchronism of the screws B and C is thereby interrupted. This abnormal mode of operation is illustrated in Fig. 5 and results in the interruption of the ordinary free action of the eccentrics. Their orbits are now caused to intersect, whereupon one or the other of the eccentrics $B^{10}$ and $C^{10}$, or $B^{11}$ and $C^{11}$, will contact and bind, and due to their rigid mounting upon the respective screws, the further rotation of the latter will be promptly and positively arrested, thereby obviating the liability to breakage or bending of the parts.

It will be apparent that many equivalent means will be comprised within the spirit of my invention. For instance, in Figs. 7 to 10, I have illustrated a form wherein the pairs of eccentrics are dispensed with, and in lieu thereof the screws A and C are provided with intermeshing gears $C^{20}$, the teeth $C^{21}$ of which are so arranged and spaced that in normal operation, (see Fig. 9), and so long as the screws are rotated in unison, the teeth will engage between and clear each other without disturbing or interfering with the normal rotation of the screws. It will be understood that the screws C are driven in substantially the same manner as before described, namely, by pinions which are normally held in operative position by means which yield in the event of undue strain. It will be seen that the teeth $C^{21}$ of the gears $C^{20}$ are spaced at unequal distances thereon, and that in the event of a screw being retarded, its gear $C^{20}$ will be relatively displaced with reference to the neighboring gear $C^{20}$ with which it normally engages. In the event that the synchronism is interrupted, this gear $C^{20}$ will therefore lag behind, thus disturbing the normal meshing of the gears (see Fig. 10), and due to their peculiar spacing, the teeth $C^{21}$ of the arrested gear will engage on the periphery of the teeth of the neighboring gear, which continues to rotate, instead of in the spaces between them. This peripheral contact of the teeth obviously arrests the rotation of the screws in the same manner as previously described.

Turning now to the second branch of my invention, and referring to Figs. 1, 2 and 3 of the drawings, this comprises means whereby the arrest of the distributing mechanism automatically disengages the driving devices. As previously stated, while this mechanism may be and is advantageously employed in connection with the before-described means for arresting the distributer screws, it is similarly available in other relations and in cases where it may be desired automatically to throw the power out of action in the event of the undue resistance of some driven part. The sprocket chain $A^3$ which imparts motion to the sprocket wheel $A^2$ is operated by a sprocket wheel D mounted upon the rotating sleeve $D^1$. The wheel D is formed with a cylindrical extension $D^8$ interiorly screw threaded at $D^3$ to engage a corresponding screw thread upon the sleeve $D^1$. The parts $D^1$ and $D^8$ are held in normal operative relation to each other by the torsional spiral spring $D^2$ connected thereto, the turning effect of the spring being limited by the engagement of a pin $D^5$ on the extension $D^8$ with a pin $D^4$ on the sleeve $D^1$, and a second pin $D^4$ being mounted upon the sleeve $D^1$ to limit the relative movement of the parts in the opposite direction. In ordinary circumstances, the force of the spring $D^2$ is adequate to hold the parts in their normal relation, but in the event of resistance being offered through the sprocket chain $A^3$ to the wheel D, the spring $D^2$ yields and permits the sleeve $D^1$ to rotate relatively to the wheel D and its extension $D^8$, and due to the screw thread connection of the parts, this relative rotation results also in a longitudinal relative movement of the wheel D and extension $D^8$ on the sleeve $D^1$. It is this lateral movement of the wheel and its extension which is availed of to disconnect the driving mechanism. Power is imparted by a belt or in any suitable manner to the driving wheel F mounted upon the extension sleeve $F^1$ on the stud or spindle $F^2$ and within the previously mentioned sleeve $D^1$. Rotation is imparted to the sleeve $D^1$ by the friction member or extension $D^6$ thereon, which is normally pressed into engagement with the driving wheel F by the spring $D^7$. The sleeve $D^1$ is also provided with the cam $D^{10}$, formed with laterally extending cam surfaces, whereby the sleeve may be moved longitudinally against the force of the spring $D^7$ and in such manner as to break the connection of the friction member $D^6$ with the driving wheel F. The means for engaging the lateral cam surfaces of the cam $D^{10}$ are carried by the stop member H, pivoted at $H^1$ in such manner that, unless restrained, it drops forward and projects its finger $H^3$ into the path of the cam. When the machine is operating in the ordinary manner, the stop member H is held in its uppermost or inactive position, it being retained therein by the engagement of its lateral arm $H^2$ with the pivoted trigger G. The trigger G is normally pressed forward by a spring $G^1$ so as to bring its upper portion in front of the arm $H^2$, and its lower portion against and in contact with the extension $D^8$ of the sprocket wheel D.

The operation of the parts will now be readily apparent. If the wheel D is arrested for any reason, as for instance by the sprocket chain $A^3$ in the manner previously described, the continued rotation of the sleeve $D^1$, due to the screw thread connection $D^3$, effects the lateral shifting of the wheel D and its cylindrical portion $D^8$, and the latter acting upon the trigger G withdraws its support from the arm $H^2$ of the stop member H, which consequently moves forward and projects the finger $H^3$ into the path of the cam $D^{10}$, and due to the continued rotation of the sleeve $D^1$, it is moved longitudinally by the cam against the force of the spring $D^7$, and thereby breaks the operative connection of its friction member $D^6$ with the driving wheel F, and the parts come to rest.

As previously stated, I have illustrated my invention herein by way of example in preferred form and as applied to the distributer of a linotype machine. Many modifications and variations will suggest themselves to those skilled in the art and still be comprised within the spirit of my invention; and similarly it will be apparent that it may be adapted to typographical composing machines other than of the line casting variety, such for instance as machines wherein it is desired to handle type or dies instead of matrices.

Having thus described my invention, its construction and mode of operation, what I claim and desire to secure by Letters Patent of the United States, is as follows:

1. In a typographical machine, the combination of a plurality of synchronously operated rotary members, operating means therefor, with means independent of the operating means and carried by the respective members to contact and prevent their rotation whenever their rotary synchronism is disturbed.

2. In a typographical machine, the combination of a plurality of synchronously operated rotary distributing devices, with means connected thereto and arranged to engage when the rotary synchronism is interrupted and thus to arrest the rotary movement of the said devices.

3. In a typographical machine, the combination of a plurality of synchronously operated rotary distributing devices with cooperating means carried by the respective devices to arrest their rotary movement when their rotary synchronism is interrupted.

4. In a typographical machine, the combination of a plurality of synchronously operated rotary distributing devices, with centric means carried thereby to arrest th rotary movement when the synchonous operation is interrupted.

5. In a typographical machine, the combination of a plurality of synchronously operated rotary distributing devices, with cooperating eccentric means carried by the respective devices, the said eccentric means being mounted to clear each other normally but to contact and lock when the synchronous operation is interrupted.

6. In a typographical machine, the combination of a plurality of rotary distributing devices, means to operate them normally in synchronism but arranged to be shifted out of their normal relations, and means connected to the distributing devices which engage and thus arrest positively their rotary movement when their rotary synchronism is interrupted.

7. In a typographical machine, the combination of a plurality of rotary distributing devices, means to operate them normally in synchronism but mounted to yield in the event of undue strain thereon, and means connected to the distributing devices which engage and thus arrest positively their rotary movement when their rotary synchronism is interrupted.

8. In a typographical machine, the combination of two synchronously operated distributer screws, and two pairs of oppositely located eccentrics mounted respectively on the said screws, the said pairs of eccentrics being arranged to clear each other normally but to contact and lock when the synchronous operation is interrupted.

9. In a typographical machine, the combination of two distributer screws, means to operate them normally in synchronism but mounted to yield in the event of undue strain thereon, and two pairs of oppositely located eccentrics mounted respectively on the said screws, the said pairs of eccentrics being arranged to clear each other normally but to contact and lock when the synchronous operation is interrupted.

10. In a typographical machine, the combination of the rotary screws B and C, with arresting eccentrics $B^{10}$ and $B^{11}$ mounted on the screw B, and arresting eccentrics $C^{10}$ and $C^{11}$ mounted on the screw C.

11. In a typographical machine, the combination of the screws B and C, mea to operate them normally in synchronism, the said means including the yielding gear $C^2$, and the eccentrics $B^{10}$ and $B^{11}$ mounted on the screw B, and the eccentrics $C^{10}$ and $C^{11}$ mounted on the screw C.

12. In a typographical machine, the combination of the screw B, the eccentrics $B^{10}$ and $B^{11}$ thereon, the screw C, the eccentrics $C^{10}$ and $C^{11}$ thereon, and means to operate the screws B and C normally in synchronism, the said means including the gear $C^2$ loose on the screw C, and the spring $C^{12}$ connecting the gear $C^2$ to the eccentric $C^{11}$.

13. In a typographical machine, the combination with distributing mechanism comprising a plurality of rotary members operating in defin e relation to each other, of means for positively arresting their rotation when such rotary relation is disturbed.

14. In a typographical machine, the combination of a plurality of rotary distributing devices, with means associated therewith to arrest positively their rotary motion, said means being inactive in the normal operation of the distributing devices but adapted to be rendered active by the abnormal rotary operation of said devices.

15. In a typographical machine, the combination of distributing mechanism, actuating means connected thereto, and means to arrest the distributing mechanism, with devices whereby upon the arrest of the distributing mechanism the further operation of the actuating means breaks the actuating connection.

16. In a typographical machine, the combination of distributing mechanism, driving means, and means to arrest the distributing mechanism with connections whereby upon the arrest of the distributing mechanism the connections act to disengage the driving means.

17. In a typographical machine, the combination of distributing mechanism, actuating means therefor, and means to arrest the distributing mechanism, the said actuating means comprising a clutch and devices normally operating therewith but adapted upon the arrest of the distributing mechanism to break the clutch.

18. In a typographical machine, the combination of distributing mechanism, rotary actuating means connected thereto, and means to arrest the distributing mechanism, the said actuating means comprising an element normally rotating therewith and adapted to be moved relatively to the actuating means upon the arrest of the distributing mechanism and to break the actuating connection.

19. In a typographical machine, the combination of distributing mechanism, rotary actuating means connected thereto, and means to arrest the distributing mechanism, the said actuating means comprising an element normally rotating therewith but adapted upon the arrest of the distributing mechanism to be moved axially to break the actuating connection.

20. In a typographical machine, the combination of distributing mechanism and rotary actuating means therefor, the said rotary actuating means comprising a clutch, a member connected thereto by a screw thread and normally rotating therewith, and means whereby the arrest of the said member causes it to move axially to disengage the clutch and thus arrest the distributing mechanism.

21. In a typographical machine, the combination of distributing mechanism and rotary actuating means therefor, the said actuating means comprising a clutch, a member connected thereto by a screw thread and a spring so as normally to rotate therewith, but whereby the arrest of the said member causes it to move axially to disengage the clutch and thus arrest the distributing mechanism.

22. In a typographical machine, the combination of distributing mechanism and rotary actuating means therefor, the said actuating means comprising a clutch, a member D connected thereto by the screw thread $D^3$ and the spring $D^2$, and devices whereby the arrest of the member D disengages the clutch and thus arrests the distributing mechanism.

23. In a typographical machine, the combination of a rotary distributing device, with arresting means therefor comprising coöperating rotary members mounted to clear each other normally, but to engage and bind when their normal rotation is interfered with.

24. In a typographical machine, the combination of two synchronously-operated rotary distributing devices, with arresting means therefor comprising two coöperating members connected to the respective distributing devices and arranged to engage when the synchronous rotary operation of said devices is disturbed.

25. In a typographical machine, the combination with two rotatable distributing devices normally operating in unison and one capable of a slight independent rotation relatively to the other, of arresting means therefor comprising coöperating members carried by the respective devices and formed to engage when said independent rotation takes place.

26. In a typographical machine, the combination with the distributing mechanism and actuating means connected thereto, of means for arresting the distributing mechanism without simultaneously breaking the actuating connection.

27. In a typographical machine, the combination with a rotary distributing device and actuating means therefor, of means independent of the actuating means for arresting said device when its normal rotation is disturbed.

28. In a typographical machine, the combination with the distributing mechanism and actuating means connected thereto, of means acting first to arrest the distributing mechanism and further means acting thereafter to break the actuating connection.

In testimony whereof I hereunto set my hand this 29th day of March, 1912, in the presence of two attesting witnesses.

JOHN RAPHAEL ROGERS.

Witnesses:
 DAVID S. KENNEDY,
 ARTHUR P. PAINE.